United States Patent [19]

Glicksman et al.

[11] Patent Number: 4,526,799

[45] Date of Patent: * Jul. 2, 1985

[54] PROCESS FOR PREPARING A HIGH QUALITY, REDUCED-CALORIE CAKE

[75] Inventors: Martin Glicksman, Valley Cottage; John R. Frost, Beacon, both of N.Y.; Jerry E. Silverman, Hamilton Square, N.J.; Elizabeth Hegedus, Tarrytown, N.Y.

[73] Assignee: General Foods Corporation, White Plains, N.Y.

[ * ] Notice: The portion of the term of this patent subsequent to Mar. 5, 2002 has been disclaimed.

[21] Appl. No.: 588,631

[22] Filed: Mar. 12, 1984

Related U.S. Application Data

[63] Continuation of Ser. No. 355,405, Mar. 8, 1982.

[51] Int. Cl.³ .............................................. A21D 13/08
[52] U.S. Cl. ..................... 426/553; 426/804; 426/555
[58] Field of Search ................... 426/552–555, 426/804, 640

[56] References Cited

U.S. PATENT DOCUMENTS

| | | | |
|---|---|---|---|
| 4,219,580 | 8/1980 | Torres | 426/549 |
| 4,275,088 | 6/1981 | Hart | 426/554 |
| 4,304,768 | 12/1981 | Staub et al. | 426/558 |
| 4,351,852 | 9/1982 | Rule et al. | 426/554 |
| 4,379,782 | 4/1983 | Staub et al. | 426/558 |

OTHER PUBLICATIONS

Solka-Floc ®, Brown Company, 2 University Plaza, Hackensack, N.J. (Brochure: "Nature's Own Ingredient . . .").

*Primary Examiner*—Raymond Jones
*Assistant Examiner*—Elizabeth A. King
*Attorney, Agent, or Firm*—Thomas A. Marcoux; Thomas R. Savoie; Daniel J. Donovan

[57] ABSTRACT

A dry cake mix comprising 10–50% cake flour by weight, dry basis, 0–45% sugar, 2–12% shortening, 0–20% egg white solids, 1–12% leavening agent, 0–4% emulsifier, 1–20% bulking agent and from 0–10% gum. The cake mix is combined with from 0.6 to 2.5 parts by weight water for each 1 part cake mix and baked to produce a low-calorie cake containing less than 2 calories per gram and 40% or more water on an as-consumed basis. This low-calorie cake is of high quality and excellent texture and is 40% or more calorie-reduced over conventional cakes.

8 Claims, No Drawings

PROCESS FOR PREPARING A HIGH QUALITY, REDUCED-CALORIE CAKE

This is a continuation of application Ser. No. 355,405, filed 3/8/82, pending.

TECHNICAL FIELD

This invention relates to reduced calorie food-stuffs and in particular to the production of a greater than 40% calorie-reduced cake of high quality containing at least 40% or more water due to the incorporation of bulking agents either alone or combination with gums.

BACKGROUND ART

For centuries people have been weight conscious and have been striving to maintain diets that will enable them to control their weight. In the past few years research efforts in the low-calorie food area have been greatly accelerated by medical reports disclosing the fact that a great many people in the U.S. are overweight and the adverse consequences associated therewith. Recent research efforts in the food art have been directed primarily to the production of baked goods that would satisfy one's appetite but will not increase one's caloric intake, e.g., materials that will have bulk but which are not digested by human beings. Examples of such foods are those that contain low calorie bulk fillers, gums or combination of gums and fillers.

U.S. Pat. No. 3,676,150 entitled Low Calorie Yeast Leavened Baked Products issued to Glicksman et al. teaches the production of low-calorie, yeast-leavened baked products, specifically a bread which contains 50% or less of the calories normally contained by a conventional bread. This reduction in calories is attributable to the flour which is used in this recipe. The invention is predicated on the use of three materials in specific proportions to constitute a gluten-free flour which will emulate the properties of wheat flour. The flour contains from 1-10% of a cellulosic gum by weight of the flour, a starch component, preferably wheat starch of from 30-70% by weight and alphacellulose from 30-70% by weight. The finished baked product has a moisture content from 50-60%.

U.S. Pat. No. 4,109,018 entitled Low Calorie Diet Bread issued to Thompson teaches the production of a low-calorie bread containing wheat gluten, protein, alphacellulose, and a hydrophilic gum. The presence of the gum results in extra water retention whereby the dough contains 76% water.

U.S. Pat. No. 4,219,580 entitled Flour Substitutes issued to Torres teaches a method of extending flour whereby up to 70% of the flour is replaced by the substitute flour of the invention yielding a caloric reduction of up to 35%. The substitute flour consists of cellulose, xanthan gum and an emulsifier.

U.S. Pat. No. 3,574,634 entitled Low Calorie Foodstuffs issued to Singer teaches a low-calorie synthetic foodstuff, namely a dough, containing less than 10 or 15% by weight of assimilable carbohydrate and consisting essentially of vital gluten, a non-nutritive edible filler, preferably a cellulosic material, a vegetable gum and water. The dough produced according to the invention will contain a flour component of 50 parts by weight, an inert filler of from 10 to 50 parts by weight, and a vegetable gum of from 1 to 10 parts by weight and water at 50 to 100 parts by weight. The caloric content of a typical synthetic bread produced according to the Singer invention will be greater than 50% calorie reduced when compared to a conventional bread.

The key to making a low-calorie baked product is to dilute the recipe with a low/non caloric ingredient (bulk filler, water, etc.), yet, maintain the structure and texture of the full calorie counterpart. With the exception of the Torres patent, all of the previously mentioned patents disclose a process or a composition for forming a dough to prepare a bread. Cake and bread, although, apparently similar baked goods, depend on two entirely different mechanisms to achieve their respective product structures and textures. Bread is a yeast-leavened system whose matrix is developed by mechanically "working" a wheat flour protein (gluten). The critical consideration in bread is the continuity of the gluten network. When a low-calorie bread is attempted, the calorie reducing dilutant must not interrupt the gluten network and must also be compatable with the living yeast.

Cake is a chemically leavened system whose matrix is a foam. This foam has the batter as the lamella and a combination of air (from mixing) and carbon dioxide from the baking soda/powder as the gaseous phase. The critical considerations in cake are the surface energy and flow characteristics of the batter. The calorie reducing dilutant must not hinder the lamella forming ability of the batter or an uneven foam structure (or no foam structure) will result.

The present inventors compared cakes made according to their process containing their level of ingredients versus cakes embodying the Torres patent. They found that the examples in the Torres patent produced cakes which were less than 25% calorie reduced and which contained less than 25% water in the cake as consumed. The Torres cakes were perceived to be excessively dry. Cakes made according to the present invention however were greater than 40% calorie reduced and while they contained 40% or more water on an as-consumed basis, the cakes had a good overall taste perception, one which was not perceived to be overly moist.

Accordingly, it is an object of the present invention to provide a low-calorie cake having a reduction in the caloric content of 40% or more and a moisture content of 40% or more. It is another object of the invention to provide a low calorie cake which although contains a high amount of moisture, is not perceived to be excessively moist and which provides desirable texture and structure in the finished cake product.

DISCLOSURE OF THE INVENTION

The invention relates to a low-calorie cake and to a dry cake mix which when reconstituted will produce a high quality, low-calorie cake which contains 40% or more water on an as-consumed basis and less than 2 calories per gram. The caloric reduction and high moisture content are attributable to the presence of a bulk filler or bulk fillers, selected from the group consisting of citrus albedo, sugar beet pulp, and pineapple core. The caloric content of less than 2 calories per gram corresponds to a greater than 40% calorie reduction as compared to a conventional cake. Preferably the caloric reduction will be 50% or greater.

The combination of a bulk filler or bulk fillers either alone or in combination with a gum or gums may be incorporated into a reduced-calorie dry mix cake formulation which would require only the addition of water and proper mixing by the consumer utilizing a conventional electric mixer. The cake mix after it's combined with water and baked will be greater than 40% calorie-reduced (less than 2 calories per gram) and it will contain at least 40% or more water. This dry mix would contain the percentage of ingredients set forth in Table I expressed as a broad range and as a preferred range.

TABLE I

| Ingredient | Broad Range (%) | Preferred Range (%) |
|---|---|---|
| Cake Flour | 10–50 | 18–40 |
| Sugar | 0–45 | 15–40 |
| Shortening | 2–12 | 3–10 |
| Egg White Solids | 0–20 | 1–12 |
| Leavening Agent | 1–12 | 2–10 |
| Emulsifier | 0–4 | 0.5–3 |
| Bulking Agent | 1–20 | 2–15 |
| Gum | 0–10 | 0.1–6 |

The dry mix cake formulation may also contain optional ingredients such as salt, vanillin, non-fat milk solids, flavor, color, etc. Also, should one desire an even greater caloric reduction, an artificial sweetener could be added to replace some or all of the sugar component.

The dry mix is reconstituted by the consumer by the addition of from 0.6 to 2.5 parts by weight water for each 1 part of the dry mix. The combination is mixed thoroughly with a household electric mixer for 1 to 5 minutes until smooth and uniform and is then baked at a temperature within the range of from 300° F. to 450° F. (149° C. to 232° C.) from 10 minutes to 60 minutes to produce a bake loss within the range of 5 to 20%. Preferably the dry mix will be comprised of the ingredients in the preferred range as specified in Table I. The preferred bake loss will vary from 8–12%.

The dry cake mix formulations represented in Table I when mixed with water and baked in accordance with the above directions will produce a finished baked cake which will contain the following percentages of ingredients as set forth in Table II.

TABLE II

| Ingredient | Broad Range (%) | Preferred Range (%) |
|---|---|---|
| Water | 40–65 | 45–55 |
| Cake Flour | 5–30 | 9–25 |
| Sugar | 0–25 | 8–20 |
| Shortening | 1–6 | 1–5 |
| Egg White Solids | 0–10 | 1–6 |
| Leavening Agent | 0.5–6 | 1.0–5 |
| Emulsifier | 0–2 | 0.1–2 |
| Bulking Agent | 1–10 | 1–8 |
| Gum | 0–10 | 0.1–3 |

Alternatively, instead of using the dry cake mix, a batter formulation could be prepared from the individual ingredients. This batter formulation when baked would produce the high quality, low-calorie cake containing the same percentage of ingredients represented in Table II. The batter formulation (prebaked) contains the following ingredients set forth in Table III expressed in a broad and preferred range on a by weight total basis of the batter formulation:

TABLE III

| Ingredient | Broad Range (%) | Preferred Range (%) |
|---|---|---|
| Water | 40–65 | 45–55 |
| Cake Flour | 5–30 | 9–25 |
| Sugar | 0–25 | 8–20 |
| Shortening | 1–6 | 1–5 |
| Egg White Solids | 0–10 | 1–6 |
| Leavening Agent | 0.5–6 | 1.0–5 |
| Emulsifier | 0–2 | 0.1–2 |
| Bulking Agent | 1–10 | 1–10 |

TABLE III-continued

| Ingredient | Broad Range (%) | Preferred Range (%) |
|---|---|---|
| Gum | 0–10 | 0.1–3.0 |

Ideally the batter formulation should be mixed thoroughly until smooth and uniform. The batter viscosity should fall within the range of 15,000 to 50,000 cps., preferably from 20,000 to 30,000 cps. as measured by a Brookfield Model HAT Viscometer using T-bar B (36 mm.) at 5 RPM.

A novel feature of the low-calorie cake of the present invention is that even though it contains 40% or more water on an as-consumed basis it is perceived of as being somewhat "dry" and it is not perceived to be excessively moist, or gummy. Additionally, the cake product does not possess a gritty or gummy mouthfeel as was characteristic of low-calorie cakes made in the past.

The high-quality reduced-calorie cake of this invention contains a bulk filler or combination of bulk fillers which act as a water binder. Specifically three bulking agents are preferred for use in the present invention. These bulking agents are citrus albedo, sugar beet pulp and pineapple core. These bulking agents are preferably prepared by a process which involves reducing the size of the starting material to prepare coarse particles or slices which are preferably less than ½ inch, water-washing to remove soluble carbohydrates, alcoholic extraction of color and bitter constituents preferably using isopropyl alcohol, desolventizing and drying, and finally milling to the consistency of flour.

The high-quality, reduced-calorie cake may also contain a gum or gums in combination with the above specified bulking agents. Good quality cakes have been made incorporating the following gums in combination with the bulking agent or agents: carrageenan, guar, gum arabic, locust bean gum, tragacanth, karaya, hydroxypropylcellulose, methylcellulose, carboxymethylcellulose, xanthan, pectin, alginates, agar and similar hydrocolloids.

For purposes of this invention, leavening agent is defined as a substance or substances used to cause gas permeation throughout a batter or dough, thereby, lightening and raising the batter or dough and its subsequent product. Examples of leavening agents include sodium bicarbonate (baking soda) and sodium aluminum phosphate (Levair-Stauffer Chemical Co.).

An emulsifier is defined as surface active agent that causes the integral, uniform mixing of the fat and water components of a batter or dough. The emulsifier also lowers the surface tension of the batter allowing for greater gas incorporation. Examples of suitable emulsifiers include polyoxyethelene (20) sorbitan mono-oleate (Tween 80-ICI Americas, Inc.), sodium stearyl-2-lactylate (Emplex-Patco), and mono and diglycerides.

This invention is further illustrated but not limited by the following examples.

EXAMPLE 1

The following dry-mix formulation was used to make a 50% calorie-reduced cake utilizing orange albedo as the bulking agent.

| Ingredient | Weight in Grams Dry Basis | Percent of Dry Cake Mix, Dry Basis |
|---|---|---|
| Cake flour | 86.8 | 37.58 |

-continued

| Ingredient | Weight in Grams Dry Basis | Percent of Dry Cake Mix, Dry Basis |
|---|---|---|
| Sugar | 78.1 | 33.81 |
| Shortening (Durlo-Durkee) | 17.4 | 7.53 |
| Orange Albedo Powder | 17.4 | 7.53 |
| Egg White Solids (Henningsen P110) | 11.3 | 4.89 |
| Baking Soda | 5.2 | 2.25 |
| Sodium Aluminum Phosphate (Levair-Stauffer) | 5.2 | 2.25 |
| Non Fat Milk Solids | 4.3 | 1.86 |
| Sodium stearyl-2-lactylate (Emplex-Patco) | 3.5 | 1.52 |
| Salt | 0.9 | 0.39 |
| Polyoxyethelene (20) sorbitan mono-oleate (Tween 80-ICI Americas Inc.) | 0.9 | 0.39 |
| Total | 231.0 | 100.00 |

The dry cake mix was prepared according to the following procedure. The sugar, shortening and Tween 80 were creamed together in a Mixmaster bowl. All the other ingredients were dry blended, then sifted twice. The cream phase and dry blend were added together in a 5 quart Hobart bowl and mixed with a paddle for 5 minutes at Speed #2, stopping at 1 minute intervals to scrape down the bottom and sides.

| Product preparation Ingredients | Amount |
|---|---|
| 1 package dry mix prepared utilizing the above procedure and ingredients | 231 grams |
| Water | 269 mls. |

Place the dry mix in a mixing bowl. While mixing at the lowest speed (Speed Setting #1), add water. Continue mixing until combined. Then mix at high speed for 30 seconds. Scrape down the sides and bottom of the mixing bowl. Mix at high speeds for 30 seconds longer and then scrape down once again. Mix at high speed for 1 minute and then scrape down sides and bottom of bowl. Finally, mix at low speed for 1 minute. Pour the batter into a greased 8 inch baking pan. Bake for 30 minutes at 350° F. (177° C.). The resulting bake loss was approximately 10%.

The finished cake was of excellent overall quality and had a caloric value of 1.88 calories/gram as compared with the conventional white cake with 3.75 calories/gram (U.S.D.A. Handbook #8). The moisture content of the cake on an as-consumed basis was 49%. The low-calorie cake contained the following percentages of ingredients on an as-consumed basis.

| Ingredient | % As Consumed |
|---|---|
| Cake flour | 19.26 |
| Sugar | 17.36 |
| Shortening | 3.87 |
| Orange albedo powder | 3.87 |
| Egg White Solids | 2.51 |
| Baking soda | 1.16 |
| Sodium aluminum phosphate | 1.16 |
| Non fat milk solids | 0.96 |
| Sodium stearyl-2-lactylate | 0.78 |
| Salt | 0.20 |
| Polyoxyethelene (20) sorbitan mono-oleate | 0.20 |
| Water | 48.67 |

-continued

| Ingredient | % As Consumed |
|---|---|
| | 100.00 |

EXAMPLE 2

The following formulation was used to make a 50% calorie-reduced cake utilizing pineapple core as the bulking agent.

| Ingredient | Weight in Grams Dry Basis | Percent of Dry Cake Mix, Dry Basis |
|---|---|---|
| Cake flour | 85.0 | 35.92 |
| Sugar | 76.5 | 32.35 |
| Shortening (Durlo-Durkee) | 17.0 | 7.19 |
| Egg White Solids (Henningsen P110) | 17.0 | 7.19 |
| Pineapple core bulking agent | 21.3 | 9.01 |
| Baking Soda | 5.1 | 2.16 |
| Sodium Aluminum Phosphate (Levair-Stauffer) | 5.1 | 2.16 |
| Non Fat Milk Solids | 4.3 | 1.82 |
| Sodium stearyl-2-lactylate (Emplex-Patco) | 3.4 | 1.44 |
| Salt | 0.9 | 0.38 |
| Polyoxyethelene (20) sorbitan mono-oleate (Tween 80-ICI Americas Inc.) | 0.9 | 0.38 |
| Total | 236.5 | 100.00 |

| Product Preparation Ingredients | Amount |
|---|---|
| 1 package dry mix prepared utilizing the above procedure and ingredients | 236 grams |
| Water | 264 mls. |

The cake is prepared in a similar manner as discussed in Example 1. The bake loss was approximately 10%. The finished cake was of excellent overall quality and had a caloric value of 1.88 calories/gram as compared with the conventional white cake with 3.75 calories/gram (U.S.D.A. Handbook #8). The moisture content of the cake on an as-consumed basis was 47%. The low-calorie cake contained the following percentages of ingredients on an as-consumed basis.

| Ingredient | % As Consumed |
|---|---|
| Cake flour | 18.80 |
| Sugar | 17.00 |
| Shortening | 3.78 |
| Egg White | 3.78 |
| Pineapple core bulking agent | 4.73 |
| Baking soda | 1.13 |
| Sodium aluminum phosphate | 1.13 |
| Non fat milk solids | 0.96 |
| Sodium stearyl-2-lactylate | 0.76 |
| Salt | 0.20 |
| Polyoxyethelene (20) sorbitan mono-oleate | 0.20 |
| Water | 47.53 |
| | 100.00 |

EXAMPLE 3

The following formulation was used to make a 50% calorie-reduced cake utilizing sugar beet pulp powder as the bulk filler.

| Ingredient | Weight in Grams Dry Basis | Percent of Dry Cake Mix, Dry Basis |
|---|---|---|
| Cake flour | 84.3 | 35.30 |
| Sugar | 75.9 | 31.80 |
| Sugar beet pulp bulking agent | 25.3 | 10.60 |
| Shortening (Durlo-Durkee) | 16.9 | 7.08 |
| Egg White Solids (Henningsen P110) | 16.9 | 7.08 |
| Baking Soda | 5.1 | 2.14 |
| Sodium Aluminum Phosphate (Levair-Stauffer) | 5.1 | 2.14 |
| Non Fat Milk Solids | 4.2 | 1.76 |
| Sodium stearyl-2-lactylate (Emplex-Patco) | 3.4 | 1.42 |
| Salt | 0.8 | 0.34 |
| Polyoxyethelene (20) sorbitan mono-oleate (Tween 80-ICI Americas Inc.) | 0.8 | 0.34 |
| Total | 238.7 | 100.00 |

The dry cake mix is prepared in a similar manner as discussed in Examples 1 and 2.

| Product Preparation Ingredients | Amount |
|---|---|
| 1 package of dry mix prepared utilizing the above procedure and ingredients | 238 grams |
| Water | 262 mls. |

The cake is prepared in a similar manner as discussed in Examples 1 and 2. The resulting bake loss was approximately 10%.

The finished cake was of excellent overall quality and had a caloric value of 1.88 calories/gram as compared with the conventional white cake with 3.75 calories/gram (U.S.D.A. Handbook #8). The moisture content of the cake on an as-consumed basis was 47%. The low-calorie cake contained the following percentage of ingredients on an as-consumed basis.

| Ingredient | % As Consumed |
|---|---|
| Cake flour | 18.70 |
| Sugar | 16.89 |
| Sugar beet pulp bulking agent | 5.62 |
| Shortening | 3.76 |
| Egg white solid | 3.76 |
| Baking soda | 1.13 |
| Sodium aluminum phosphate | 1.13 |
| Non fat milk solids | 0.93 |
| Sodium stearyl-2-lactylate | 0.76 |
| Polyoxyethelene (20) sorbitan mono-oleate | 0.18 |
| Water | 47.14 |
| | 100.00 |

What is claimed:

1. A process for producing a low-calorie cake which comprises:

combining from 0.6 to 2.5 parts by weight water with a dry cake mix, said dry cake mix comprising 10 to 50% cake flour by weight, dry basis; 0 to 45% sugar; 2 to 12% shortening; 0 to 20% egg white solids; 1 to 12% leavening agent; 0 to 4% emulsifier; 1 to 20% of a bulking agent selected from the group consisting of citrus albedo, sugar beet pulp, pineapple core, and combinations thereof; and 0 to 10% gum;

throughly mixing the combination until it is smooth and uniform; and baking the combination at a temperature within the range of from 300° F. to 450° F. from 10 minutes to 60 minutes to produce a bake loss within the range of 5 to 20%.

2. The process of claim 1 wherein the dry cake mix comprises 18 to 40% cake flour; 15 to 40% sugar; 3 to 10% shortening; 1 to 12% egg white solids; 2 to 10% leavening agent; 0.5 to 3% emulsifier; 2 to 15% bulking agent and 0.1 to 6% gum.

3. The process of claim 1 or 2 wherein the bake loss range is from 8 to 12%.

4. The process of claims 1 or 2 wherein the leavening agent is sodium bicarbonate, sodium aluminium phosphate and combinations thereof.

5. The process of claims 1 or 2 wherein the emulsifier is polyoxyethelene (20) sobitan mono-oleate, sodium stearyl-2-lactylate, mono and diglycerides and combinations thereof.

6. The process of claims 1 or 2 wherein the gum is carrageenan, guar, gum arabic, locust bean gum, tragacanth, karaya, hydroxypropylcellulose, methylcellulose, carboxymethycellulose, xanthan, pectin, alginates, agar and combinations thereof.

7. The process according to claims 1 or 2 wherein the low-calorie cake contains less than 2 calories per gram.

8. The process according to claims 1 or 2 wherein the low-calorie cake contains 40% or more water.

* * * * *